(12) United States Patent
Gorostegui Eceiza et al.

(10) Patent No.: US 9,512,822 B2
(45) Date of Patent: Dec. 6, 2016

(54) PITCH REGULATION APPARATUS FOR A WIND TURBINE BLADE

(75) Inventors: Juan Gorostegui Eceiza, Orio (ES); Juan Gorostegui Garmendia, Andoain (ES)

(73) Assignee: DCO Servosistemas, S.L., Donostia (ES)

( * ) Notice: Subject to any disclaimer, the term of this patent is extended or adjusted under 35 U.S.C. 154(b) by 424 days.

(21) Appl. No.: 14/237,341

(22) PCT Filed: Jul. 20, 2012

(86) PCT No.: PCT/EP2012/064264
§ 371 (c)(1),
(2), (4) Date: Feb. 5, 2014

(87) PCT Pub. No.: WO2013/020795
PCT Pub. Date: Feb. 14, 2013

(65) Prior Publication Data
US 2014/0161613 A1    Jun. 12, 2014

(30) Foreign Application Priority Data
Aug. 5, 2011 (EP) .................................. 11382274

(51) Int. Cl.
*F03D 7/02* (2006.01)
(52) U.S. Cl.
CPC ....... *F03D 7/0224* (2013.01); *F05B 2270/604* (2013.01); *Y02E 10/723* (2013.01)
(58) Field of Classification Search
CPC . F03D 7/0224; Y02E 10/723; F05B 2270/604
See application file for complete search history.

(56) References Cited

U.S. PATENT DOCUMENTS 8,439,640 B2 *  5/2013  Arel .................. B64C 11/38
                                                  416/117
2010/0276932 A1  11/2010 Numari

FOREIGN PATENT DOCUMENTS

| EP | 0346313 A1 | 12/1989 |
| EP | 1988285 A1 | 11/2008 |
| GB | 1456614 A  | 11/1976 |
| WO | WO2009064264 A1 | 5/2009 |

OTHER PUBLICATIONS

Written Opinion of the International Searching Authority, Application No. PCT/EP2012/064264 issued by the European Patent Office, mailed: Nov. 14, 2012, 3 pages, Munich, Germany.
International Search Report of the International Searching Authority, Search Report, Application No. PCT/EP2012/064264, issued by the European Patent Office, mailed: Nov. 14, 2012, 3 pages, Rijswijk, Netherlands.

* cited by examiner

*Primary Examiner* — John C Hong
(74) *Attorney, Agent, or Firm* — Edell, Shapiro & Finnan LLC

(57) ABSTRACT

Rotation device of a wind turbine blade, which comprises a hydraulic actuator to rotate said blade in relation to a longitudinal axis of rotation, and a hydraulic system to drive the actuator, wherein said actuator comprises a substantially toroidal hydraulic chamber concentric with the axis of rotation of the blade, said hydraulic chamber comprising at least one moving piston linked to the blade, and at least one respective fixed stopper.

23 Claims, 10 Drawing Sheets

PITCH REGULATION APPARATUS FOR A WIND TURBINE BLADE

CROSS-REFERENCE TO RELATED APPLICATIONS

This application relates to and claims the benefit of and priority to as the 371 National Phase of International Application Number PCT/EP2012/064264, filed Jul. 20, 2012 which claims the benefit and priority to European Patent Application No. 11382274.6, filed Aug. 5, 2011.

TECHNICAL FIELD

The present invention relates to devices that are designed for the rotation of a blade of a wind turbine on its longitudinal axis.

BACKGROUND

The use of wind turbines to produce electricity from wind energy is known. The wind turbine is disposed for this purpose with blades, the rotation of which causes a rotor to be driven and as a result of which electric power is obtained. The wind turbine blades are oriented facing the wind, the number of revolutions of the rotor and the delivered power being capable of being regulated by means of a system regulating the angle of attack of each blade in relation to the wind.

There are two main known types of systems regulating the angle of attack of the blades. One of these types are electro-mechanical systems, wherein the blade is driven by a variable-speed electric motor through a planetary gear reducer, with the advantage of electric drive, without the need for a hydraulic unit or internal transmission, but with the drawback of requiring electrical batteries or additional hydraulic systems in emergencies, and with the problem that if the gear reducer is to be moved by another system, it acts as a brake. The second of these types are hydraulic systems that include hydraulic accumulators, which prevent against emergency situations in the absence of electric power, but which have the drawback of using a hydraulic circuit that includes a servo-actuator that drives the blade by means of a swivel coupling that converts the linear movement into a rotary movement, generating unwanted torques.

Patent application EP1988285 A1 describes a device for controlling the blades of a wind turbine, in which each blade is linked to rotational means on its longitudinal axis in order to modify the angle of attack of the blades. The rotational means comprise a hydraulic circuit that includes a safety and emergency control module, a safety and emergency hydraulic accumulator, an electric motor and a hydraulic motor pump as drive means, and an actuator by means of which the blades are rotated.

SUMMARY OF THE DISCLOSURE

It is the object of the invention to provide a rotation device of a wind turbine blade on its longitudinal axis. Said device comprises a hydraulic actuator to cause said blade to rotate in relation to the longitudinal axis of rotation, and a hydraulic system that enables said actuator to be driven. The actuator comprises a hydraulic chamber that is substantially toroidal and concentric with the axis of rotation of the blade, said hydraulic chamber comprising at least one moving piston linked to the blade, and at least one respective fixed stopper.

This rotation device presents the advantages of the hydraulic systems, which prevent emergency situations in the absence of electric power, and also prevent the drawbacks arising with linear actuators, in that they do not convert a linear movement into a rotary movement, generating unwanted torques, as the fact that the actuator is toroidal means that the transmission of the power is distributed across the entire diameter of the blade bearing.

The design of the actuator is such that it may be inserted inside the body of the bearing itself, enabling direct driving of the blade, without external supports or additional accessories, and preventing the use of pinions and crown gears.

These and other advantages and characteristics of the invention will be made evident in the light of the drawings and the detailed description thereof.

DETAILED DESCRIPTION

Figure 1:
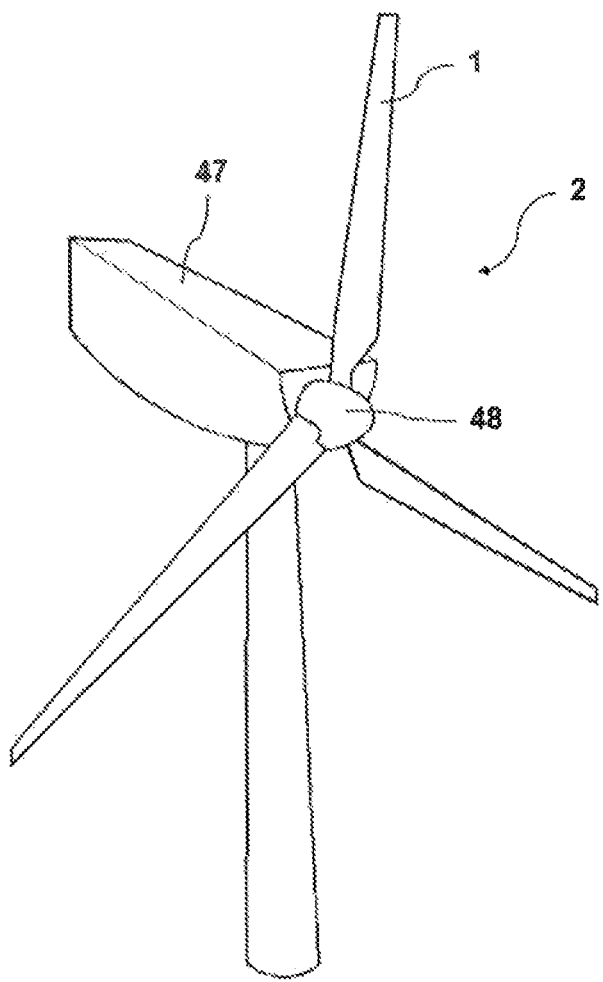
FIG. 1 shows a schematic view in perspective of a wind turbine.

FIG. 1 depicts a wind turbine 2 into which the device of the invention may be incorporated. The device of the invention enables the rotation of a blade 1 of a wind turbine 2, shown in FIG. 1, to be controlled so that the angle of attack of said blade 1 in relation to the wind may be modified, which allows the power of the electricity generator, its speed and performance to be regulated, or to cause it to stop when there is excessive wind or in an emergency, positioning the blades 1 in the position pitched parallel to the wind's direction or flag position.

The rotation device of the blade 1 of the wind turbine 2 comprises a hydraulic actuator 3 that is connected to said blade 1, and enables it to be rotated in relation to its longitudinal axis of rotation, and a hydraulic system 4 that is used to drive the actuator 3. Said actuator 3 comprises a substantially toroidal hydraulic chamber 5 concentric with the axis of rotation of the blade 1, which is linked to the hydraulic system 4, said hydraulic chamber 5 comprising at least one piston 6, which may be moved inside the hydraulic chamber 5, due to the action of the hydraulic oil inside a certain arc and is linked to the blade 1, and at least one fixed stopper 7 respective to each moving piston 6.

Figure 2:
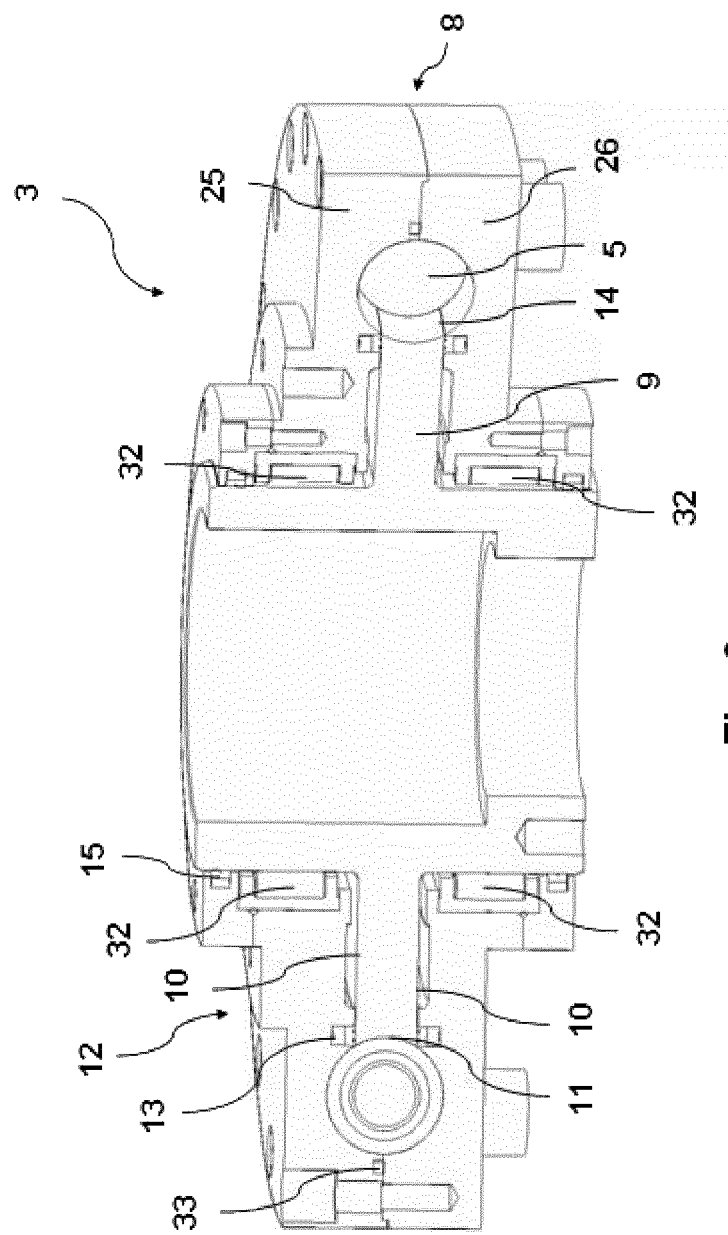
FIG. 2 shows a cross-sectional view of an embodiment of the hydraulic actuator of the rotation device of a wind turbine blade of the invention, with the moving support on the inside.

FIG. 2 shows a cross-section, according to a plane parallel to the axis of rotation of the blade 1, of an embodiment of the actuator 3 of the invention, which comprises a toroidal hydraulic chamber 5 with a circular cross-section. Said hydraulic chamber 5 is formed by two semi-bodies, one upper 25 and one lower 26, which, when connected, form a fixed main body 8, and a moving support 9 that acts as a rotating axis of the actuator 3, which is connected to the pistons 6 and is linked to the blade 1, with the result that the moving support 9 and the fixed main body 8 form the circular cross-section of the hydraulic chamber 5.

The moving support 9 is in this embodiment a disc-shaped piece with a hollow central axis, comprising two flat faces 10, an upper and a lower one, perpendicular to the axis of rotation of the blade 1 and in contact with the main body 8 in its upper semi-body 25 and lower semi-body 26 respectively, and one of the lateral faces 11 that delimits the hydraulic chamber 5 along with the main body 8. In the embodiment of the invention shown in FIG. 2, the lateral face 11 of the moving support 9 delimits the hydraulic chamber 5 from the side of said hydraulic chamber 5 that is closer to the axis of rotation of the blade 1, the moving support 9 behaving as an internal axis of rotation of the actuator 3. In another embodiment of the invention, shown in FIG. 3 in a detail of a cross-section according to a plane parallel to the axis of rotation of the blade 1, the lateral face 11 of the moving support 9 delimits the hydraulic chamber 5 from the side of said hydraulic chamber 5 that is further from the axis of rotation of the blade 1, the moving support 9 behaving as an external axis of rotation of the actuator 3.

Figure 3:
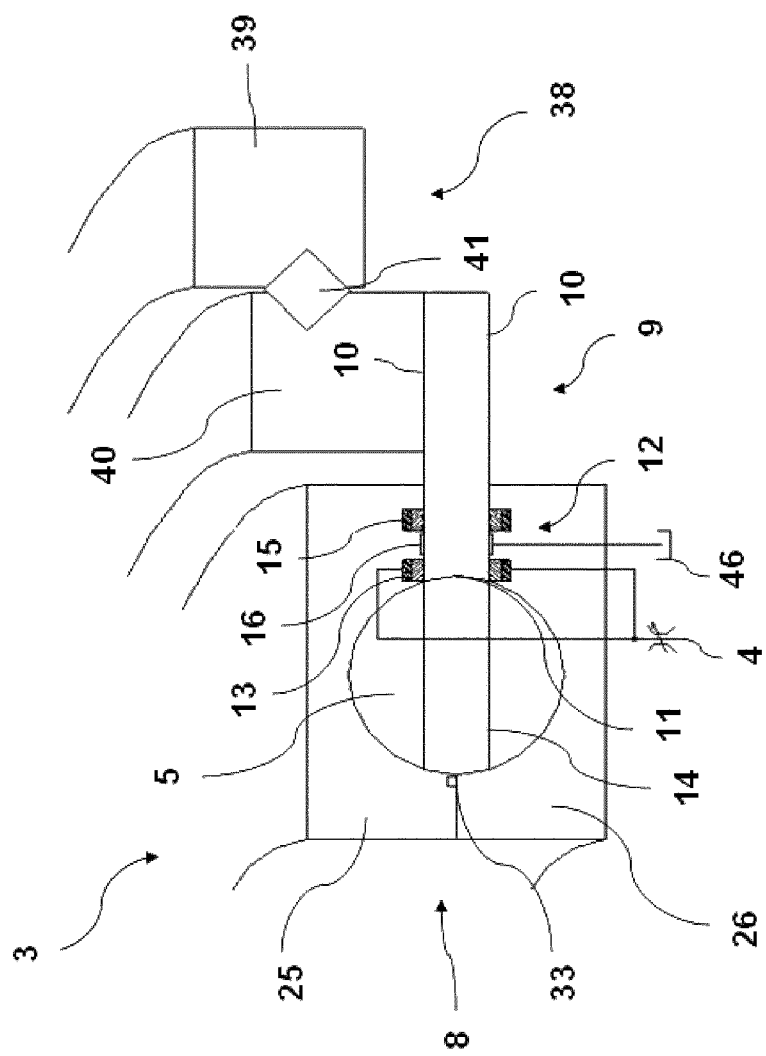
FIG. 3 shows a detail of a cross-sectional schematic view of another embodiment of the hydraulic actuator of the rotation device of a wind turbine blade of the invention, with the moving support on the outside.
Figure 4:
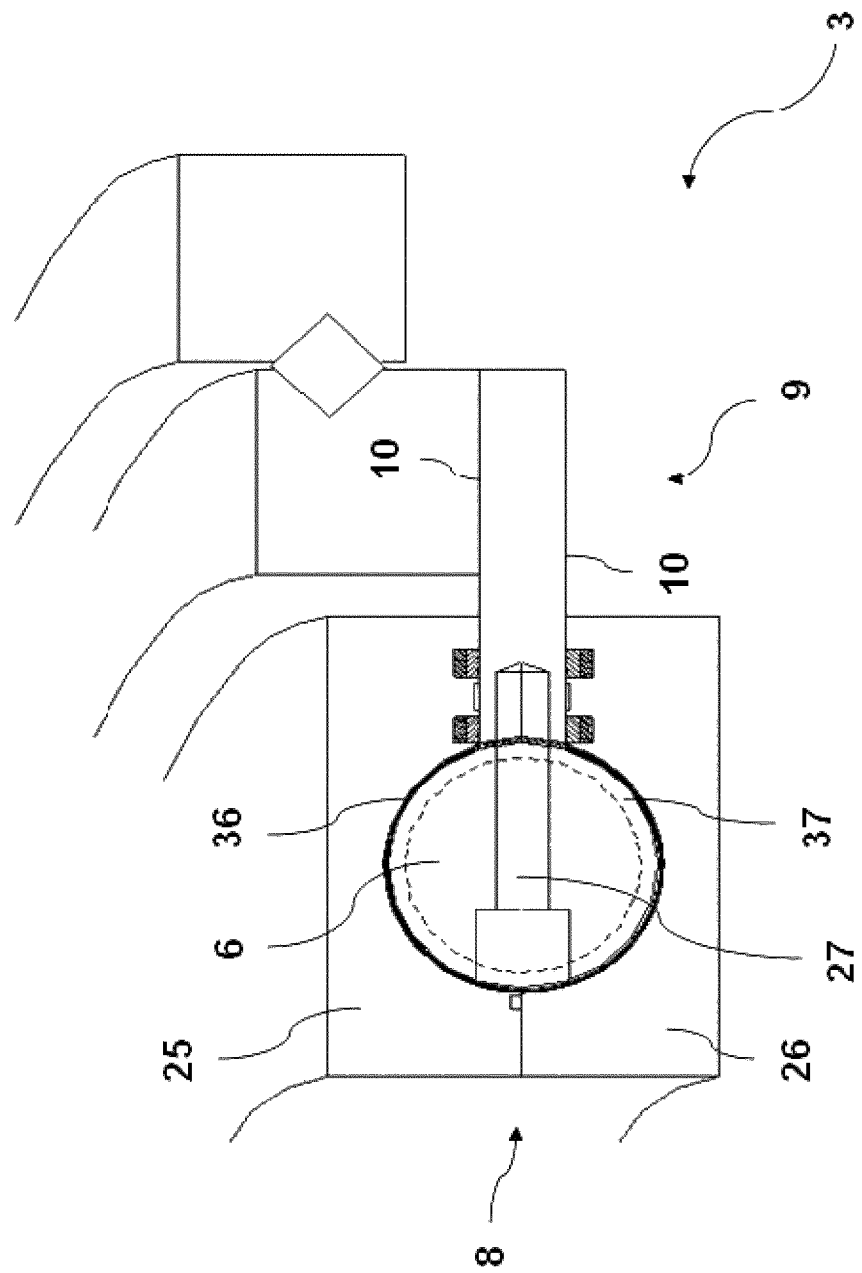
FIG. 4 shows a detail of a cross-sectional schematic view of the hydraulic actuator of FIG. 3, in an area that coincides with a moving piston.

FIG. 4 shows a detail of a cross-section of the actuator 3 according to the embodiment shown in FIG. 3, which coincides in an area where a piston 6 is found. The piston 6 is connected to the moving support 9 by means of connection elements 27, for example screws, preferably two of them, in the section of the diameter of the hydraulic chamber 5 corresponding to the moving support 9, in a connection formed from the piston 6 to the moving support 9.

Figure 5:
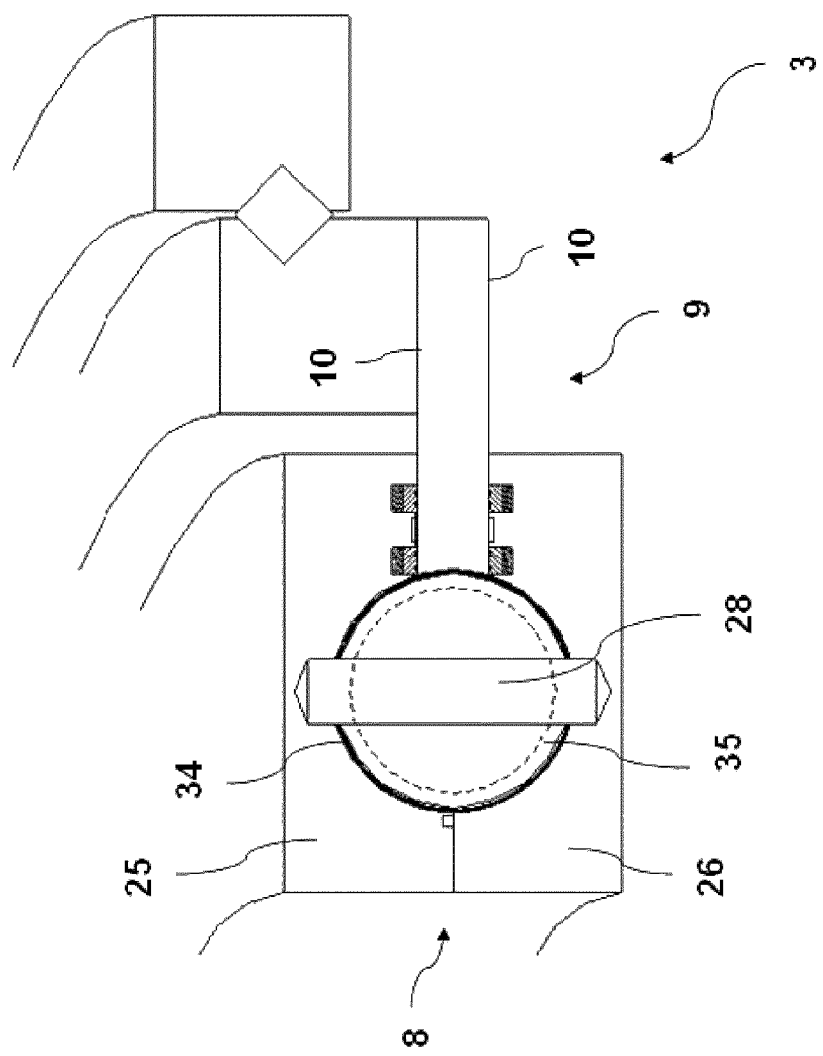
FIG. 5 shows a detail of a cross-sectional schematic view of the hydraulic actuator of FIG. 3, in an area that coincides with a fixed stopper.

FIG. 5 shows a detail of a cross-section of the actuator 3 according to the embodiment shown in FIG. 3, which coincides in an area where a stopper 7 is found. The stopper 7 is connected to the fixed main body 8, both to the upper semi-body 25 and to the lower semi-body 26, by means of connection elements 28, for example bolts or pins, preferably two of them, in the section of the diameter of the hydraulic chamber 5 corresponding to the fixed main body 8, in a connection formed from the stopper 7 to the upper semi-body 25 and the lower 26 semi-body.

Figure 6:
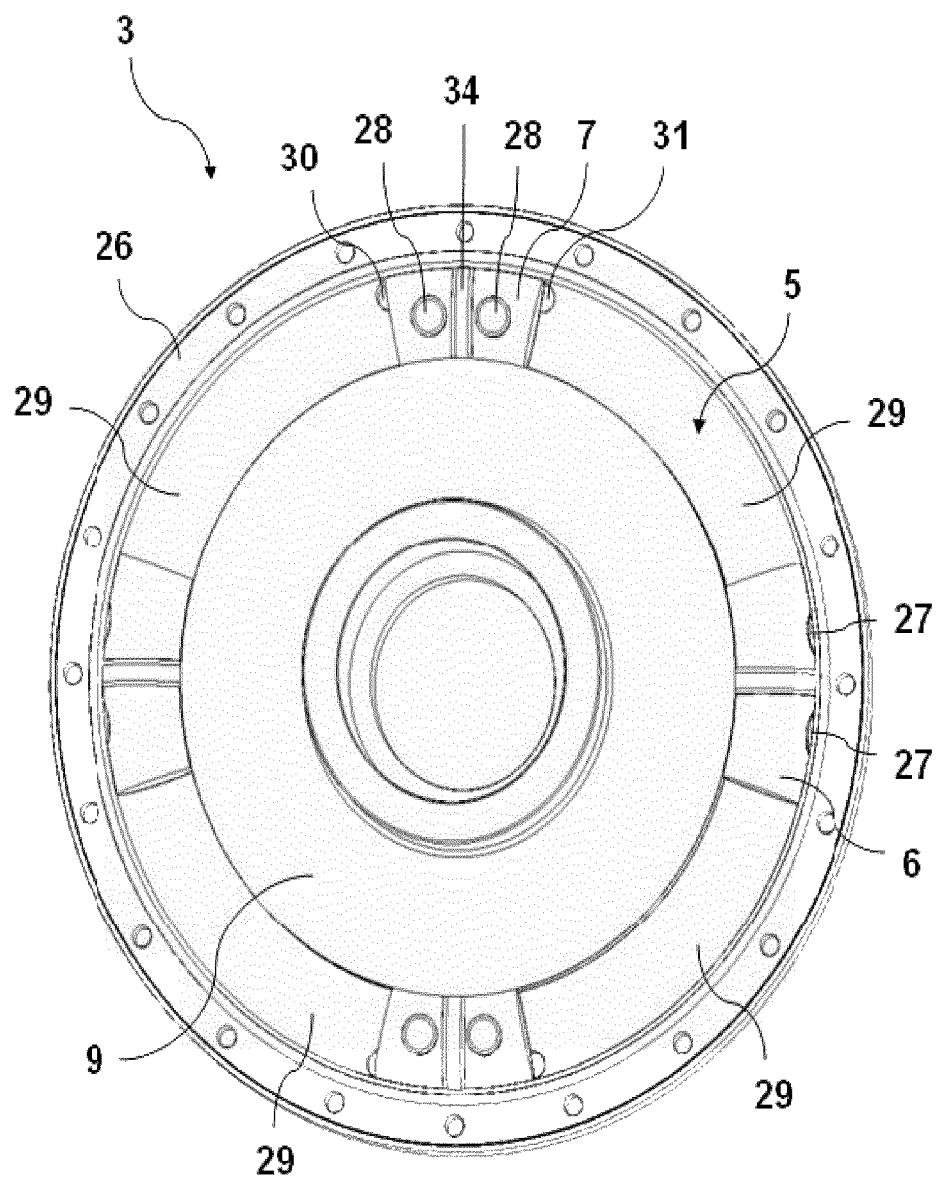
FIG. 6 shows a plan view of the hydraulic actuator of FIG. 2, without the upper semi-body, and with two pairs of moving pistons and respective fixed stoppers.
Figure 7:
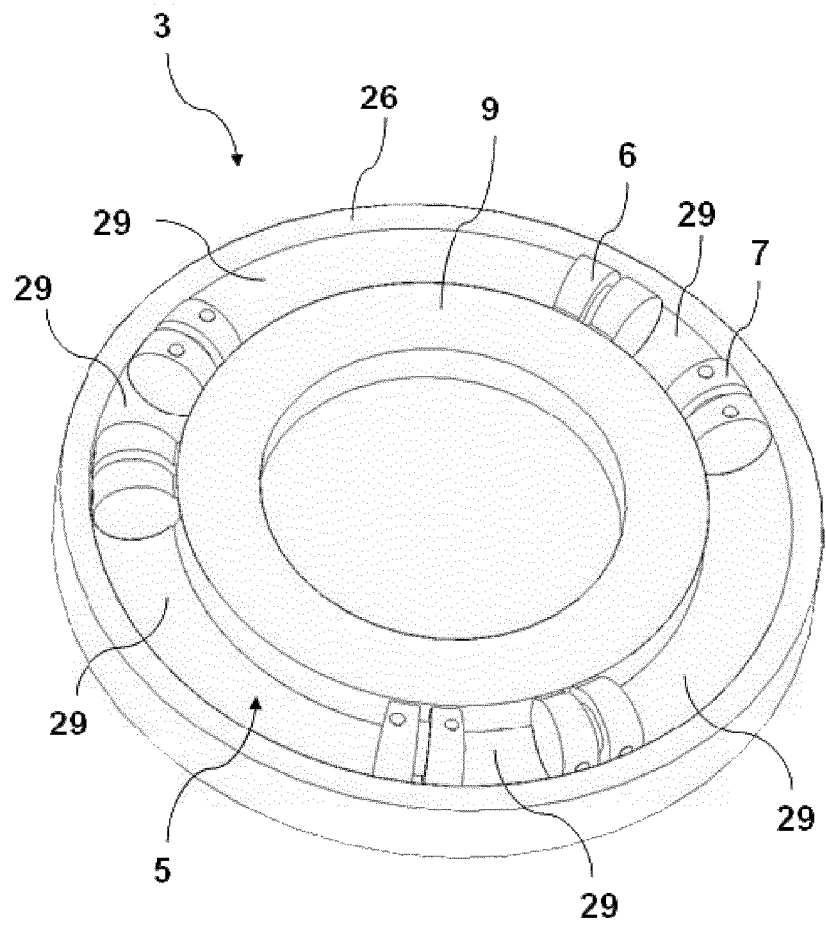
FIG. 7 shows a view in perspective of another embodiment of the hydraulic actuator, without the upper semi-body, and with three pairs of moving pistons and respective fixed stoppers.

The connection between the pistons 6 and the moving support 9, and between the stoppers 7 and the main body 8, is analogous if the moving support 9 behaves as an internal axis of rotation of the actuator 3, in other words, in the embodiment shown in FIGS. 2 and 6, and in the embodiment of FIG. 7.

As shown in FIGS. 6 and 7, where the actuator 3 is shown without the upper semi-body 25, the lower semi-body 26 and the stoppers 7 remain fixed, and the moving support 9 and the linked pistons 6 may move in the arc of the hydraulic chamber remaining between every two stoppers 7, as many semi-chambers 29 being formed as there are stopper 7 and piston 6 units disposed in the hydraulic chamber 5, two active parts being generated between each two stoppers 7, with an intermediate piston 6. Both the stoppers 7 and the pistons 6 are toroidal arcs coinciding with the radius of the hydraulic chamber 5, and their cross-section is a circle coinciding with the circular cross-section of said chamber 5. This configuration is analogous when the moving support 9 behaves as an external axis of rotation of the actuator 3.

In the embodiment shown in FIG. 7 three pairs of pistons 6 with respective stoppers 7 are arranged, forming 6 semi-chambers 29, the arc occupied by the three pairs of pistons 6 and stoppers 7 amounting to 90°, the moving support 9 obtaining a maximum traverse of 90°, corresponding to the maximum perpendicularity of the blades 1 with the wind, up to the position pitched parallel to the wind's direction or flag position at 90°.

FIG. 6 shows another embodiment of the invention, which is disposed in its interior with two moving pistons 6 and two fixed stoppers 7 respective to the two moving pistons 6, forming four semi-chambers 29. With this embodiment the blade 1 is disposed with a maximum traverse of between approximately 120° and approximately 150°, depending on the arc formed by each piston 6 and each stopper 7 inside the hydraulic chamber 5, from the maximum perpendicularity of the blade 1 with the wind, up to the flag position. This provides the blades 1 with an extra margin of rotation, absorbing the lack of speed of the system of rotation of the nacelle 47 of the wind turbine 2, in response to rapid changes in the direction of the wind, and, therefore, its lack of alignment in relation to it, and adapting itself more quickly to said changes in order to ensure the rotation of said blades 1 remains efficient. In this embodiment the rotation of the blade 1 is less powerful in relation to the preceding embodiment, as the number of pairs of pistons 6 and stoppers 7 is reduced, although the rotation traverse of the blade 1 is increased.

Close to the stoppers 7 are situated holes 30, 31, one on each side of each stopper 7, on the surface of the hydraulic chamber 5 in the lower semi-body 26. Said holes 30, 31 are linked to the hydraulic system 4, with the result that when the blade 1 is to be rotated in one direction, the hydraulic fluid enters through the hole of each semi-chamber 29, with the result that pressure is exerted on the pistons 6 and they are moved all the way along the hydraulic chamber 5, the hydraulic fluid exiting through the hole of the adjacent semi-chamber 29, towards the hydraulic system 4. When the blade 1 is to be rotated in the other direction, the introduction and removal of the hydraulic fluid in the different semi-chambers 29 is inverted.

The semi-chambers 29 created in the arc of the hydraulic chamber 5 are hydraulically linked in an alternating manner, thereby achieving a hydraulic actuator with a double effect similar to that of any conventional actuator. The distribution of the pressure and the flow in these two active parts may be achieved by means of a servo-valve or proportional valve, with the result that by closing a loop of angular position by means of a sensor and the corresponding control, the system becomes an angular servo-actuator.

The main body 8 and the stoppers 7 are linked and there is no relative movement between them, although they do move together in relation to the moving support 9. In contrast, the pistons 6 and the moving support 9 are linked to each other, and their movement is relative in relation to the unit formed by the main body 8 and stoppers 7. These movements are significant in the hydraulic actuator 3 due to the fact that as there is a flow of hydraulic fluid from and to the hydraulic system 4, it is susceptible to leakage, with a loss in its performance possibly occurring as a result. It is thus important that the sealing system in said actuator 3 is defined. Said sealing system is based on the entire unit of the actuator 3 being concentric, it being secured radially between the moving support 9 and the main body 8 by means of two internal radial bearings 32 disposed between said moving support 9, when this behaves as an internal axis of rotation, and each semi-body of said main body 8, as can be seen in FIG. 2. The axial concentricity of said moving support 9 and said main body 8 is guaranteed by means of hydrostatic rings or axial bearings disposed between the faces 10 of the moving support 9 and the upper semi-body 25 and the lower semi-body 26 of the main body 8 (not shown in the figures). When the moving support 9 is external, radial concentricity is guaranteed by a bearing 38 of the blade 1, which comprises two parts: a fixed part 39 linked to the structure of the wind turbine 2, and which is also linked to the main body 8 of the actuator 3, and a moving part 40 linked to the moving support 9 and to the blade 1, a rolling member 41 being disposed between both, as shown in FIG. 3.

The main body 8, which is formed by the upper semi-body 25 and the lower semi-body 26, is fixed and its sealing in relation to the exterior, is performed in a static manner by a standard static sealing gasket 33, as there is no friction, as shown in FIGS. 2 and 3.

As the pistons 6 and the stoppers 7 make relative movements, each is disposed with a sealing system that guarantees the non-communication of the hydraulic fluid between both sides of each one of them. The stoppers 7, which are toroidal cylinders, are disposed with a circular sealing gasket 34 that surrounds the stopper 7 on its perimeter and is housed in a channel 35 formed in said stopper 7, between the two connection elements 28, it projecting out and covering the gap between the surface of the hydraulic chamber 5 and the surface of the stopper 7, thereby preventing hydraulic fluid from leaking in the relative movement between the stopper 7 and the moving support 9. As a result, sealing is achieved in a static manner in the semi-chambers 29 on the sides of each stopper 7, and in a dynamic manner in the arc corresponding to the moving body 9, as shown in FIG. 5. Similarly, the pistons 6, which are also toroidal cylinders but with a projection that offsets the gap with the moving body 9 in the area of connection of the connection elements 27, are disposed with a circular sealing gasket 36 that surrounds the piston 6 on its perimeter and is housed in a channel 37 formed in said piston 6, between the two connecting elements 27, it projecting out and covering the gap between the surface of the hydraulic chamber 5 and the surface of the piston 6, thereby preventing hydraulic fluid from leaking in the relative movement between the piston 6 linked to the moving support 9 and the main body 8. As a result sealing is achieved in a static manner with the moving support 9, and in a dynamic manner in its movement inside the hydraulic chamber 5, as shown in FIG. 4.

The toroidal actuator guarantees sealing in relation to the moving support 9 by means of two sealing units 12 disposed peripherally between the main body 8 and the moving support 9, covering the gap formed all along the perimeter, as shown in FIGS. 2 and 3. Said sealing units 12 perform a dual function: they prevent hydraulic fluid from leaking to the exterior through the moving support 9, and they prevent leakage between semi-chambers 29 through the flat faces 10 of the moving support 9 and all the way along the arc of the hydraulic chamber 5. An effect of the alternative movement of the pistons 6 all the way along the hydraulic chamber 5 is that in the 360° arc of the chamber 5 that cover the sealing units 12, there are areas of high pressure and areas of low pressure, which move in accordance with the movement of the moving support 9 as a result of the action of the movement of the pistons 6, and alternate depending on the direction of rotation of the moving support 9, said sealing units 12 being required to guarantee sealing while offsetting changing differential pressures.

The sealing unit 12 shown in FIG. 2, corresponds to a hydraulic actuator 3 with the moving support 9 on the inside, and comprises two sealing gaskets 13 and 15. The sealing gasket 13 is the closer of the two to the hydraulic chamber 5, and covers the line of connection 14 formed between the main body 8 and the moving support 9. The second sealing gasket 15 is further from it, and is disposed behind the radial bearing 32, covering the outlet of the connection of the upper semi-body 25 and the lower semi-body 26, and the moving support 9, on the outside, with the result that the hydraulic fluid that drains from the sealing gasket 13 lubricates the area up to the sealing gasket 15, lubricating the radial bearing 32 and the axial bearings (not shown in the figures).

The sealing unit 12 shown in FIG. 3, where the moving support 9 is external, comprises two sealing gaskets 13 and 15 with a drainage channel 16 between both sealing gaskets. The sealing gasket 13 is the closer of the two to the hydraulic chamber 5 and covers the line of connection 14 formed between the main body 8 and the moving support 9. The second sealing gasket 15 is further from it, and between both there is a drainage channel 16 that collects any hydraulic fluid that leaks from the sealing gasket 13, and channels it to a tank 46 where the hydraulic fluid is deposited.

Figure 8:
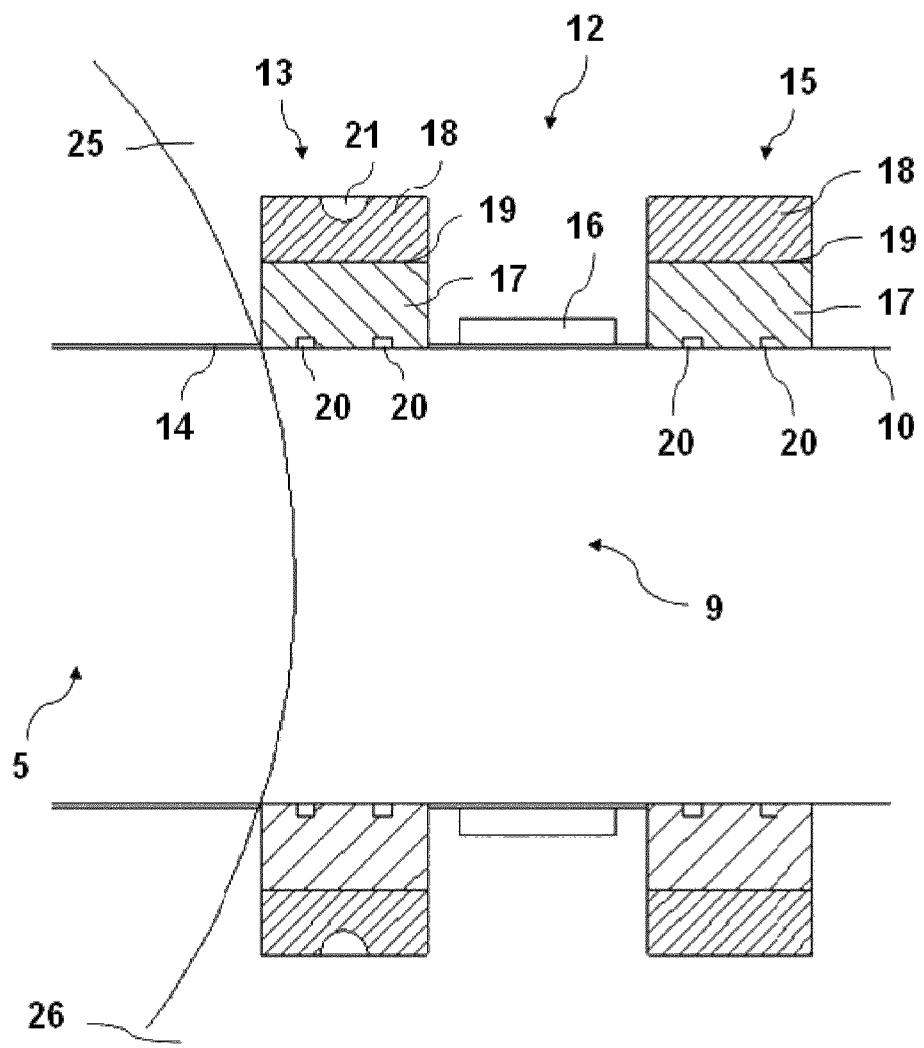
FIG. 8 shows a detailed front view of a sealing gasket and the drainage channel of the hydraulic actuator of the embodiment of FIG. 3.

FIG. 8 shows how each one of the sealing gaskets 13 and 15 is formed by two parts: a rigid part 17 that is in contact with the moving support 9, and a flexible part 18 disposed on the rigid part 17 and connected to it on a face 19 parallel to the surface of the moving support 9. The rigid part 17 comprises at least one groove 20 all the way along the perimeter of the sealing gaskets 13, 15, and in contact with the surface of the moving support 9. Said groove 20 fills with oil and its function is therefore to reduce and balance the friction caused when the moving support 9 moves, in its relative movement in relation to the main body 8, in its contact with the rigid part 17. The flexible part 18 of the sealing gasket 13 comprises at least one groove 21 all the way along the perimeter of said sealing gaskets 13, being filled with oil under pressure from the hydraulic system 4, and as a result exerts a force against the rigid part 17, thereby balancing the pressure at the maximum arising in the 360° arc of the hydraulic chamber 5, due to the movement of the moving support 9. In another embodiment, said groove 21 may be located in a channel of the upper semi-body 25 and lower semi-body 26, which houses the sealing gasket 13. The flexible part 18 of the sealing gasket 15 is not disposed with said groove 21.

The actuator 3 of the rotation device of the blade 1 of the wind turbine 2 shown in FIG. 3 is connected to said blade 1 by the main bearing 38, which comprises two parts: a fixed part 39 linked to the structure of the wind turbine 2, and which is also linked to the main body 8 of the actuator 3, and a moving part 40 linked to the moving support 9 and to the blade 1, the rolling member 41 being disposed between both, as shown in FIG. 3.

Figure 9:
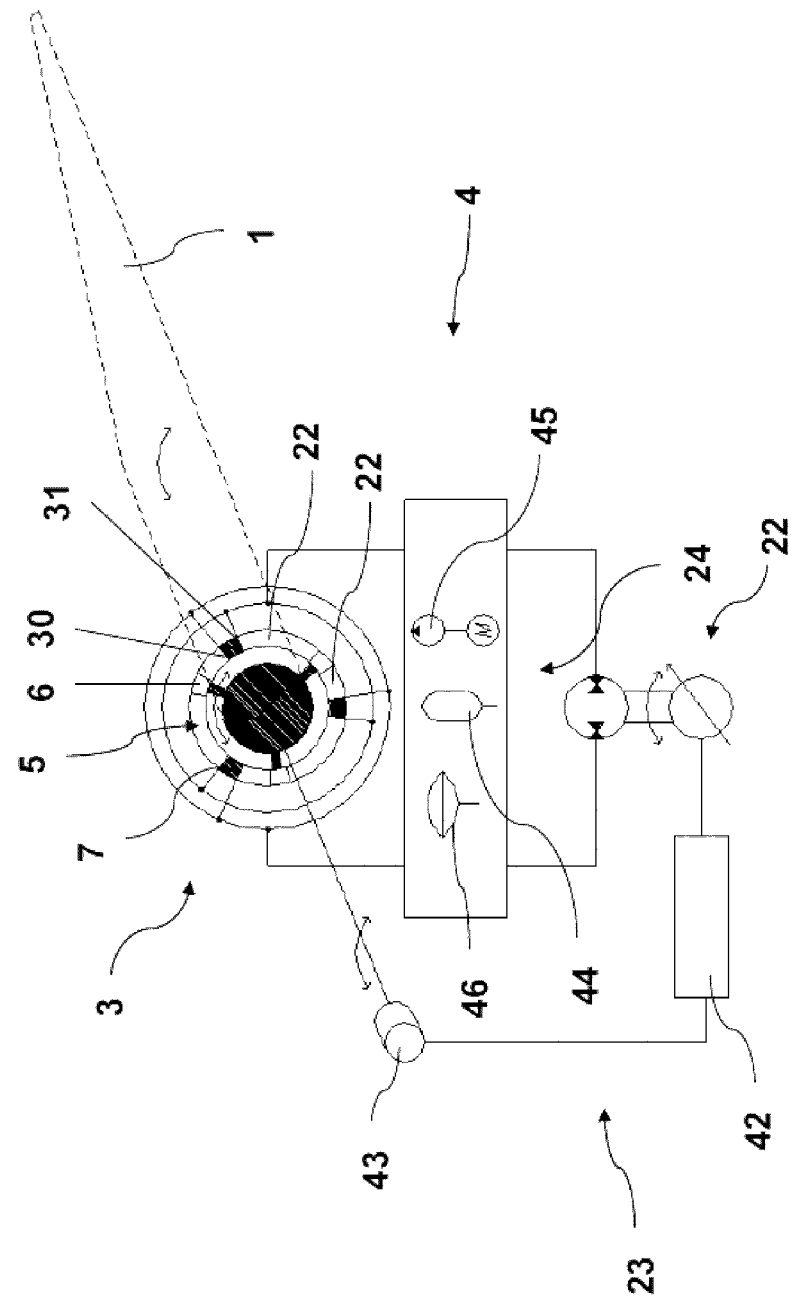
FIG. 9 shows a hydraulic diagram of an embodiment of the rotation device of a wind turbine blade of the invention.

FIG. 9 shows the rotation device of a blade 1 of a wind turbine 2 in an embodiment of the invention, which comprises the toroidal hydraulic actuator 3 and the hydraulic system 4. Said hydraulic system 4 comprises a supply means 22 of the hydraulic fluid under pressure, said supply means 22 being a unit formed by a servo-controlled and variable-speed electric motor, brushless type, and a hydraulic motor pump, both of which are reversible and which enable the advantages of an electrical supply and a hydraulic drive to be combined; a distribution and control means 23 of the hydraulic fluid and which comprises a control block 42 that regulates the supply means 22 and an encoder 43 that controls the pitch of the blades 1; and an accumulating means 24 of the hydraulic fluid under pressure, which comprises the hydraulic fluid tank 46, an emergency accumulator 44 and a micro-pump 45 that enables said accumulator 44 to be supplied, allowing the rotation of the blades 1 to be controlled and made safe during emergency stops, when there is no electric power, and to offset internal leaks, the hydraulic system 4 being completed by a hydraulic circuit that allows all the elements of the system to be linked together.

In the embodiment shown in FIG. 9 the hydraulic system 4 is integrated with the actuator 3 and forms with it a single module housed in each blade 1 or into the boogie 48 of the wind turbine 2 that supports the blades 1, in the case of which the hydraulic fluid tank 46 is a pressurised tank with a variable volume to prevent problems with said tank and its rotation, gravity and centrifugal force. The integration of this module into the blade 1 or into the boogie 48 of the wind turbine 2 that supports the blades 1, prevents the transmission of the hydraulic fluid from the nacelle 47 of the wind turbine 2, through a round-trip transmission ring, to the head of the various blades 1, and the subsequent problem of leaks and performance loss.

Figure 10:
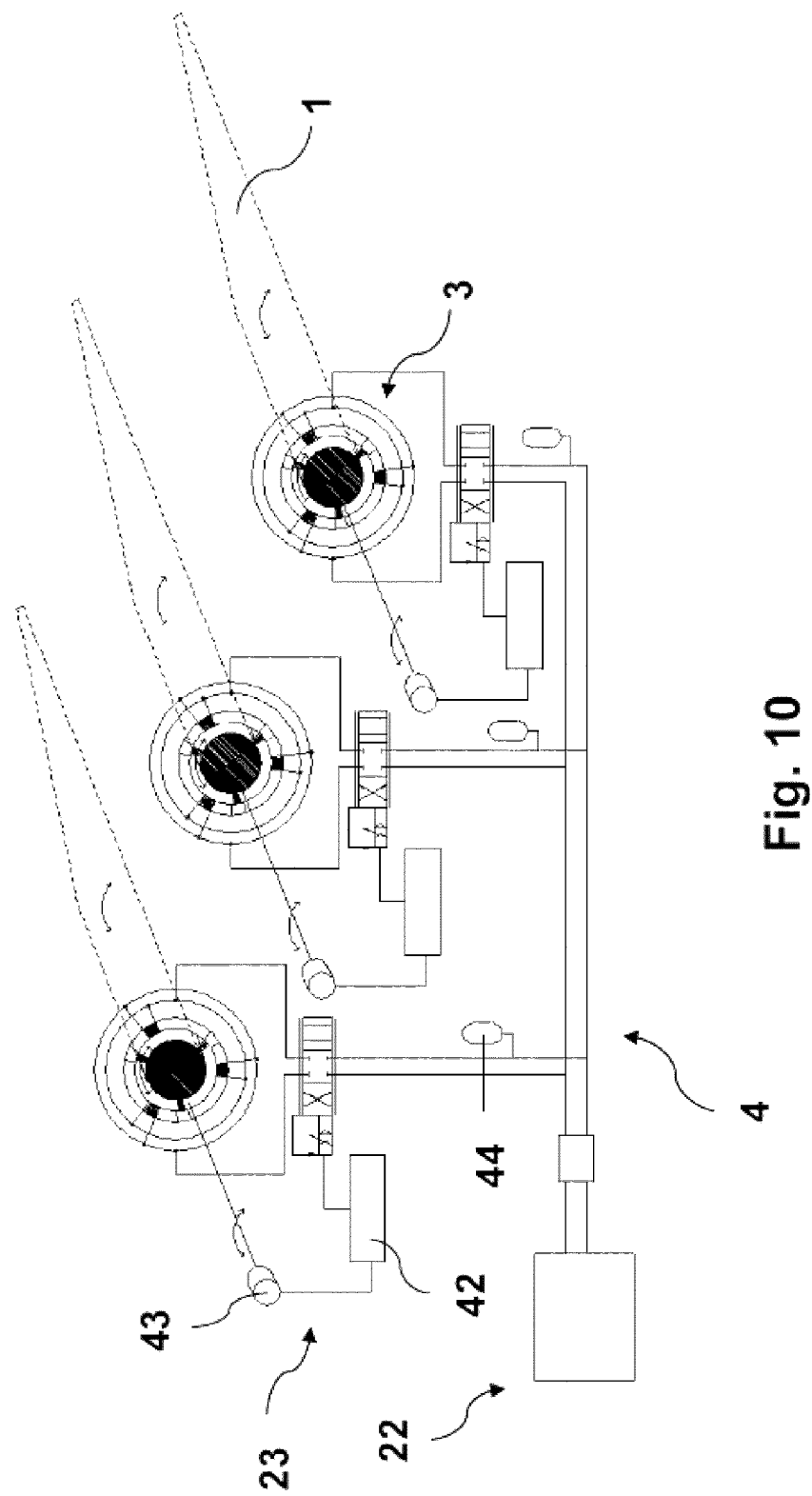
FIG. 10 shows a hydraulic diagram of another embodiment of the rotation device of a wind turbine blade of the invention.

FIG. 10 shows the rotation device of a blade 1 of a wind turbine 2 in another embodiment of the invention. The hydraulic system 4 comprises in this embodiment supply means 22 of the hydraulic fluid under pressure, said supply means 22 being a conventional hydraulic unit that is centralised in the nacelle 47 of the wind turbine 2, and supplies the hydraulic fluid under pressure by means of a distributing ring to the blades 1 of the wind turbine 2 through a rotary transmission gasket. The hydraulic system 4 also comprises the distribution and control 23 means, which comprises a control block 42 that regulates the supply means 22 and an encoder 43 that controls the pitch of the blades 1, and also comprises a servo-valve that controls each blade 1; and the emergency accumulator 44, these being integrated with the actuator 3 and forming with it a single module housed in each blade 1 or into the boogie 48 of the wind turbine 2 that supports the blades 1.

The invention claimed is:

1. An apparatus for rotating a wind turbine blade about an axis of rotation, the axis of rotation corresponding to a longitudinal axis of the blade, the apparatus comprising a hydraulic actuator having a substantially toroidal hydraulic chamber that is concentric with the axis of rotation of the blade, the substantially toroidal hydraulic chamber having disposed therein one or more pistons moveable within the substantially toroidal hydraulic chamber between one or more stationary stoppers, the one or more pistons being linked to the blade so that a movement of the one or more pistons results in a rotation of the blade about the axis of rotation.

2. The apparatus according to claim 1, wherein the hydraulic actuator comprises a stationary main body and a moving support, the moving support rotatable with respect to the stationary main body about the axis of rotation, the stationary body and moving support together forming the substantially toroidal hydraulic chamber, the one or more pistons being coupled with the moving support with the blade being coupled to the moving support.

3. The apparatus of claim 2, wherein the one or more pistons comprises a substantially toroidal cylinder that is bound circumferentially by the substantially toroidal hydraulic chamber.

4. The apparatus of claim 3, further comprising a sealing member disposed about at least a portion of the circumference of the one or more pistons, the sealing member being in contact with an inner wall surface of the substantially toroidal hydraulic chamber to effectuate a seal between opposing sides of each of the one or more pistons.

5. The apparatus of claim 2, wherein each of the one or more stationary stoppers comprises a substantially toroidal cylinder that is bound circumferentially by the substantially toroidal hydraulic chamber.

6. The apparatus of claim 5, further comprising a sealing member disposed about at least a portion of the circumference of the one or more stationary stoppers, the sealing member being in contact with an inner wall surface of the substantially toroidal hydraulic chamber to effectuate a seal between opposing sides of each of the one or more stationary stops.

7. The apparatus according to claim 2, wherein the moving support comprises first and second opposing faces that are each perpendicular to the axis of rotation of the blade, and a lateral face that forms with the main body the substantially toroidal hydraulic chamber, the stationary main body having a first surface facing the first opposing face of the moving support and a second surface facing the second opposing face of the moving support.

8. The apparatus according to claim 7, further comprising a first gasket disposed between the first opposing face of the moving support and the first surface of the stationary main body to effectuate a seal therebetween, and a second gasket disposed between the second opposing face of the moving support and the second surface of the stationary main body to effectuate a seal therebetween.

9. The apparatus of claim 8, wherein the first and second gaskets are located adjacent a line of connection between the stationary main body and the moving support.

10. The apparatus of claim 9, further comprising a third gasket disposed between the first opposing face of the moving support and the first surface of the stationary main body to effectuate a liquid tight seal therebetween, and a fourth gasket disposed between the second opposing face of the moving support and the second surface of the stationary main body to effectuate a liquid tight seal therebetween, the first and second gaskets being located closer to the axis of rotation of the blade than the third and fourth gaskets, respectively.

11. The apparatus according to claim 2, wherein the substantially toroidal hydraulic chamber has an inner diameter and an outer diameter, the inner diameter of the substantially toroidal hydraulic chamber being located closer to the axis of rotation of the blade than the outer diameter, the lateral face of the moving support forming with the stationary main body the substantially toroidal hydraulic chamber along the inner diameter of the substantially toroidal hydraulic chamber.

12. The apparatus according to claim 2, wherein the substantially toroidal hydraulic chamber has an inner diameter and an outer diameter, the inner diameter of the substantially toroidal hydraulic chamber being located closer to the axis of rotation of the blade than the outer diameter, the lateral face of the moving support forming with the stationary main body the substantially toroidal hydraulic chamber along the outer diameter of the substantially toroidal hydraulic chamber.

13. The apparatus according to claim 1, wherein the hydraulic actuator comprises first and second stationary stoppers and first and second pistons, each of the first and second pistons being disposed between the first and second stationary stoppers.

14. The apparatus according to claim 13, wherein the first and second stationary stoppers are located substantially equidistantly within the substantially toroidal chamber.

15. The apparatus according to claim 13, wherein the first and second stationary stoppers and first and second pistons form within the substantially toroidal chamber a first semi-chamber and a second semi-chamber, the apparatus further comprising a plurality of hydraulic fluid supply and/or evacuation ports for the delivery and removal of a hydraulic fluid in and out of each of the first and second semi-chambers.

16. The apparatus according to claim 15, wherein the one or more hydraulic fluid supply and/or evacuation ports are located adjacent the first and second stationary stops.

17. The apparatus according to claim 1, wherein the hydraulic actuator comprises first, second and third stationary stoppers and first, second and third pistons, the first piston being disposed between the first and second stationary stoppers, the second piston being disposed between the second and third stationary stoppers, the third piston being disposed between the first and third stationary stoppers.

18. The apparatus according to claim 17, wherein the first and second stationary stoppers are located substantially equidistantly within the substantially toroidal chamber.

19. The apparatus according to claim 17, wherein the first, second and third stationary stoppers and first, second and third pistons form within the substantially toroidal chamber a first semi-chamber, a second semi-chamber and a third semi-chamber, the apparatus further comprising a plurality of hydraulic fluid supply and/or evacuation ports for the delivery and removal of a hydraulic fluid in and out of each of the first, second and third semi-chambers.

20. The apparatus according to claim 19, wherein the one or more hydraulic fluid supply and/or evacuation ports are located adjacent the first, second and third stationary stoppers.

21. The apparatus according to claim 1, further comprising a plurality of hydraulic fluid supply and/or evacuation ports for the delivery and removal of a hydraulic fluid in and out of the substantially toroidal hydraulic chamber.

22. The apparatus according to claim 21, further comprising a hydraulic system for delivering and evacuating the hydraulic fluid, the hydraulic system being integrated with the actuator to form a single module that is capable of being housed in the blade.

23. The apparatus according to claim 21, further comprising a hydraulic system for delivering and evacuating the hydraulic fluid, the hydraulic system being integrated with the actuator to form a single module that is capable of being housed in a boogie of the wind turbine.

* * * * *